March 17, 1970 R. Z. SCHREFFLER 3,501,204
ELECTRIC CONDUCTOR BEARINGS
Filed June 30, 1966

INVENTORS
ROBERT Z. SCHREFFLER

BY Larson and Taylor
ATTORNEYS

United States Patent Office 3,501,204
Patented Mar. 17, 1970

3,501,204
ELECTRIC CONDUCTOR BEARINGS
Robert Z. Schreffler, Chester, Pa., assignor to Electric
Conductor Bearings, Incorporated
Filed June 30, 1966, Ser. No. 562,956
Int. Cl. F16c 9/00, 19/00, 27/00
U.S. Cl. 308—1                                 3 Claims

ABSTRACT OF THE DISCLOSURE

An assembly for conducting electrical current between rotating and non-rotating members is provided wherein a plurality of conductive roller or ball bearing members ride in races formed by grooves in opposed surfaces of a conductive shaft-mounted inner member and a conductive non-rotary outer member. The bearing members may be of split form including a biasing washer located between the halves thereof to ensure continuous electrical contact with the race surfaces. A coolant gas may be supplied to the bearing surfaces through a hollow terminal post which also provides a current take-off point for the assembly.

This invention relates to an improvement in the art of conducting electric current to a rotating shaft or component. In the past, this type of electrical connection has been of the well-known electrical slip ring and brush.

Ordinarily, a ball bearing, roller bearing, taper bearing, needle bearing, X type bearing or other type of load-carrying bearing is poorly adapted to carry an electric current because of non-conducting oil and grease lubrication, galling races, electrical insulation mountings, dimensional tolerances, and other similar inherent problems.

The scope of this invention relates to entire field of load and thrust bearings modified and adapted to carry electricity principally and not the physical loads usually envisioned. This modification and adaptation centers about the use of a dry electric current carrying lubricant deposited on the bearing races to replace the conventional oil, graphite, grease, soap, and other items.

For simplification of presentation only ball bearings are shown but all bearing shapes and configurations capable of being modified to carry electric current to within the scope of the invention.

Accordingly, some of the objectives of the invention being stated, other objects will appear as the description proceeds when taken in connection with the accompanying drawings, in which.

Figure 1:
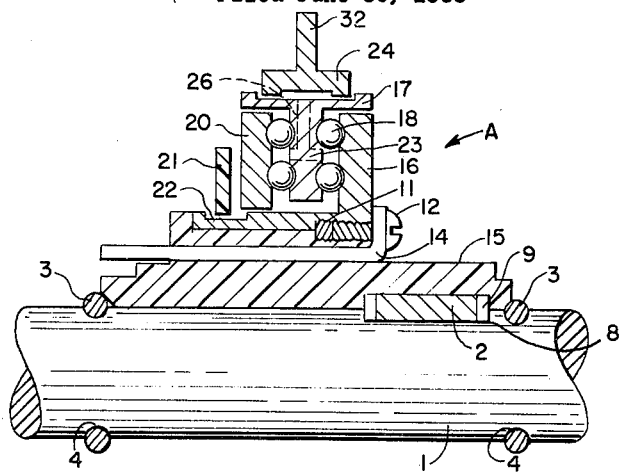
FIGURE 1 is a side elevational view partially in section of a presently preferred embodiment of the invention.

Referring to FIGURE 1, a conductor bearing assembly generally denoted A is shown mounted on a rotatable shaft 1. It is noted that the words "rotate" and "revolve" and derivatives thereof are used in the specification and claims in the sense that the "earth 'rotates' about its own axis and 'revolves' around the sun." Assembly A is mounted on shaft 1 through an arrangement including first and second circular O-rings 3 which are received in first and second, spaced, annular grooves 4 in shaft 1 and a key member 2 which is seated by keyway formed by a slot 8 in shaft 1 and a slot 9 in an annular insulating sleeve 15. This arrangement prevents both longitudinal and radial movement of assembly A relative to shaft 1.

Assembly A further includes an annular, rotary race member 16, constructed of conductive material, which radially surrounds insulating sleeve 15. A "strip" type current conductor 14 is affixed to the assembly A by means of a suitable attachment element 12 which may be a screw as shown. Attachment element 12 is received into a conductor attaching element hole 10 in the form of a threaded bore formed by hemi-cylindrical grooves in race member 16 and insulating sleeve 15. Conductor 14 and race member 16 rotate with shaft 1 and provide a path for current conduction to a shaft-mounted load (not shown) from a non-rotating race arrangement including a non-rotating race member 17. The rotary race arrangement further includes an annular element 20 which is positioned parallel to and spaced from an outwardly extending portion of race member 16 and which cooperates with this portion of race member 16 to form a split race assembly. Non-rotary race member 17 includes an inwardly extending skirt or appendage 23 which is positioned between element 20 and the outward extending portion of race member 16. The opposed faces of element 20 and the outwardly extending portion of race member 16 include first and second concentric annular grooves which cooperate with similar grooves in corresponding faces of skirt 23 to form four races, two concentric races between element 20 and one face of skirt 23 and two concentric races between the outwardly extending portion of race member 16 and the other face of skirt 23, as shown. The races so formed are adapted to receive intermediate members 18, whch may be spheres as shown. A spring preload washer 21 received in a washer groove 22 located near the end of the sleeve portion of race member 16 exerts a compressive thrust through intermediate members 18 so that the split race assembly formed by element 20 and rotary race member 16 acts to compress intermediate members 18 against skirt portion 23 of non-rotating race member 17, element 20 and rotary race member 16 acting in concert.

Figure 2:
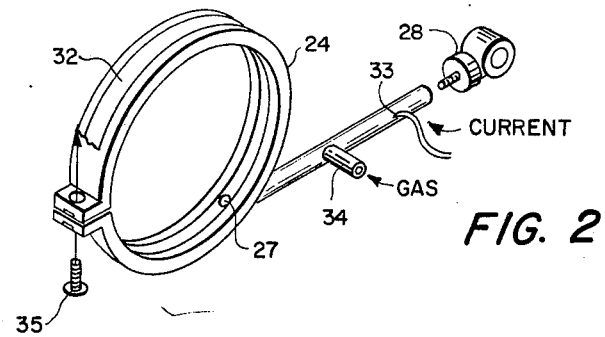
FIGURE 2 is a perspective view to a reduced scale of a portion of the embodiment of FIGURE 1.

The non-rotating conductor assembly further includes an electric current conductor attaching element 24 of a general annular configuration (shown in perspective in FIGURE 2). A heat sink 32 in the form of a cooling fin extends outwardly of element 24 and serves in dispersing electrical current-induced heat through radiation. A generally tubular outwardly extending portion of element 24 includes an extension 34 which may also be tubular to permit the passage of gas through extension 34 which may also be tubular to permit the passage of gas through extension 34 and through this outwardly extending portion of element 24 to an outlet 27 opening on the interior periphery of element 24. Non-rotary member 17 includes filtered gas inlet hole 26 (shown in dashed lines) which permits the installation of any chosen atmosphere into the roll contact area for environment control. This approach will include foreign materials, provide for cooling, expansion control, etc.

Electrical current is conducted to the attaching element 24 through an attachment point 33 located on the outwardly extending portion of element 24.

An insulating rod-end 28 "snubs" the non-rotating member 17 and the attaching element 24 and prevents these elements from turning with shaft 1.

A screw 35 maintains a tight clamping contact between the attaching element 24 and the non-rotating member 17. It is to be understood that while only a single current attaching element 12 and associated bore 11 is necessary to attach conductor 14 to the remainder of assembly A, a plurality of like elements and bore may be used in assisting in securing inner race member 16 to insulating sleeve 15.

Figure 3:
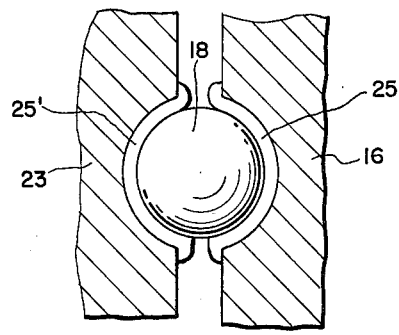
FIGURE 3 illustrates a detail of one of the bearing arrangements of the embodiment of FIGURE 1.

Referring to FIGURE 3, there is shown a dry lubricant coating denoted 25 located in the groove race formed in member 16 and a similar coating 25' in the groove race formed in skirt 23. It will of course be understood that such coatings may be located in all the races in which intermediate members 18 are received. Common dry lubricant current conducting coatings include gold, silver, platinum, rhodium, palladium, cesium, etc. and their related alloys. These dry lubricants should be somewhat malleable or ductile so that a cushioning and non-galling surface is provided. This is necessary so that current may be conducted between the conductive elements even where small surface imperfections exist in that the malleability of the lubricant will tend to "even out" these imperfections to thereby eliminate or reduce electric arcing as well as mechanical galling.

I claim:

1. An arrangement for conducting electrical current between rotating and non-rotating members comprising a current conducting device comprising inner, electrically conductive, rotatable means adapted to be mounted on a rotating shaft; outer, electrically conductive, non-rotating means; at least one intermediate electrically conductive member located in a plane perpendicular to the axis of rotation of the shaft between said inner and outer means and spaced from said axis of rotation, said at least one intermediate member making rolling peripheral contact with said rotating and non-rotating means; electrically current conducting means in electrical contact with said non-rotating member including an electrically condutive tubular terminal member permitting passage of electrical current therethrough and further defining a passageway for the flow of a gas coolant, said passageway including an inlet for receiving said coolant and an outlet for discharging said coolant in proximity to said non-rotating means, said non-rotating means including a passage for permitting the discharge of said coolant in proximity to the rolling contact surfaces of said at least one intermediate member; a dry lubricant for lubricating a contact surface of said at least one intermediate member; and resilient means for maintaining continuous electrical contact between said rotating and non-rotating means and said at least one intermediate member; said rotating means comprising first and second spaced inner race members and said non-rotating means including a centrally disposed race means located between said first and second race members, said first and second race members each including at least one grooved race formed in a surface thereof facing said centrally disposed race means and said centrally disposed race means defining first and second opposite surfaces and including first and second grooved races formed in said opposite surfaces for individually cooperating with corresponding grooved races formed in the surfaces of said first and second race members for supporting a plurality of said intermediate members therebetween; said resilient means comprising a washer for biasing said rotating members against said non-rotating means through compressive forces transmitted through said intermediate members.

2. An arrangement as claimed in claim 1 wherein first and second grooved races are formed between said first race member and one face of said centrally disposed race means and third and fourth grooved races are formed between said second race member and an opposite face of said centrally disposed race means.

3. An arrangement as claimed in claim 1 wherein said dry lubricant comprises a coating of dry lubricant located on a surface in contact with said at least one intermediate member.

References Cited

UNITED STATES PATENTS

| | | | |
|---|---|---|---|
| 1,725,740 | 8/1929 | Schulte. | |
| 2,142,931 | 1/1939 | Baker | 308—77 X |
| 2,352,206 | 6/1944 | Kendall | 308—77 |
| 2,714,538 | 8/1955 | Hornbostel | 308—77 |
| 2,776,385 | 1/1957 | Modrey | 339—15 X |
| 2,945,279 | 7/1960 | Bossetti | 308—77 X |
| 3,105,728 | 10/1963 | Seeloff. | |
| 910,900 | 6/1909 | Brown | 308—183 X |
| 913,831 | 3/1909 | Low. | |
| 1,649,276 | 11/1927 | Adam. | |
| 1,800,564 | 5/1941 | O'Conner | 308—183 XR |
| 2,175,470 | 10/1939 | Kice | 308—77 |
| 2,315,280 | 3/1943 | Skehan | 308—1 X |
| 2,328,212 | 8/1943 | Heiner. | |
| 2,354,763 | 8/1944 | Machlett | 308—26 X |
| 2,409,600 | 10/1946 | Trautschold | 310—219 |
| 2,502,252 | 3/1950 | Faile. | |
| 2,549,009 | 4/1951 | Reinhold | 308—183 X |
| 2,957,562 | 10/1960 | Rudisch | 310—90 |
| 2,754,168 | 7/1956 | Atlee | 308—188 X |
| 3,036,532 | 5/1962 | Bowe | 339—8 X |
| 3,321,729 | 5/1967 | Phillips | 339—8 |
| 3,097,027 | 7/1963 | Mims | 308—77 X |
| 3,271,723 | 9/1966 | Willing | 308—1 X |

FOREIGN PATENTS

| | | |
|---|---|---|
| 22,138 | 10/1912 | Great Britain. |
| 661,565 | 4/1963 | Canada. |

OTHER REFERENCES

German printed application, No, 1,178,750, Sept. 1964, Staneff.

German printed application, No. 1,119,400, Apr. 1960.

MARTIN P. SCHWADRON, Primary Examiner

LUCIOUS L. JOHNSON, Assistant Examiner

U.S. Cl. X.R.

308—77, 183, 241; 339—8